(12) United States Patent
Liu et al.

(10) Patent No.: US 12,536,034 B2
(45) Date of Patent: Jan. 27, 2026

(54) SCHEDULING METHOD AND APPARATUS, AND RELATED DEVICE

(71) Applicant: HUAWEI TECHNOLOGIES CO., LTD., Guangdong (CN)

(72) Inventors: Zhipiao Liu, Beijing (CN); Mingyao Zhou, Hangzhou (CN); Huicai Deng, Shenzhen (CN); Zhe Li, Hangzhou (CN)

(73) Assignee: HUAWEI CLOUD COMPUTING TECHNOLOGIES CO., LTD., Guian New District (CN)

( * ) Notice: Subject to any disclaimer, the term of this patent is extended or adjusted under 35 U.S.C. 154(b) by 845 days.

(21) Appl. No.: 17/530,560

(22) Filed: Nov. 19, 2021

(65) Prior Publication Data

US 2022/0075653 A1  Mar. 10, 2022

Related U.S. Application Data

(63) Continuation of application No. PCT/CN2019/128545, filed on Dec. 26, 2019.

(30) Foreign Application Priority Data

May 20, 2019 (CN) .......................... 201910420049.5

(51) Int. Cl.
*G06F 9/48* (2006.01)
(52) U.S. Cl.
CPC .................................. *G06F 9/4881* (2013.01)
(58) Field of Classification Search
None
See application file for complete search history.

(56) References Cited

U.S. PATENT DOCUMENTS

| | | | |
|---|---|---|---|
| 11,134,013 B1* | 9/2021 | Allen | G06F 9/5072 |
| 2005/0283782 A1 | 12/2005 | Lu et al. | |
| 2012/0304179 A1* | 11/2012 | Devarakonda | G06Q 10/00 718/102 |
| 2013/0346988 A1* | 12/2013 | Bruno | G06F 9/5066 718/102 |

(Continued)

FOREIGN PATENT DOCUMENTS

| | | |
|---|---|---|
| CN | 102841759 A | 12/2012 |
| CN | 103207814 A | 7/2013 |

(Continued)

OTHER PUBLICATIONS

International Search Report for PCT/2019/128545, dated Feb. 12, 2020, 4 pages.

(Continued)

*Primary Examiner* — Bradley A Teets
*Assistant Examiner* — Melissa A Headly (57) ABSTRACT

This application provides a scheduling method and apparatus, and a related device. The method includes a central cluster receiving a scheduling request sent by a first cluster, and determining a second cluster that meets the scheduling request. The central cluster indicates the first cluster to execute a task by using the second cluster. The method can support task cross-cluster scheduling, thereby implementing resource sharing between different clusters, and increasing resource utilization.

21 Claims, 4 Drawing Sheets

(56) References Cited

U.S. PATENT DOCUMENTS

| | | | |
|---|---|---|---|
| 2016/0139964 A1 | 5/2016 | Chen et al. | |
| 2016/0371110 A1* | 12/2016 | Radhakrishnan | G06F 11/07 |
| 2018/0219955 A1* | 8/2018 | Chen | H04L 41/0897 |
| 2019/0140796 A1 | 5/2019 | Wang et al. | |
| 2020/0310876 A1* | 10/2020 | Featonby | G06F 9/5088 |

FOREIGN PATENT DOCUMENTS

| | | |
|---|---|---|
| CN | 104052820 A | 9/2014 |
| CN | 104461740 A | 3/2015 |
| CN | 105159769 A | 12/2015 |
| CN | 105871580 A | 8/2016 |
| CN | 106371889 A | 2/2017 |
| CN | 106790483 A | 5/2017 |
| CN | 107493191 A | 12/2017 |
| CN | 107621973 A | 1/2018 |
| CN | 108011862 A | 5/2018 |
| CN | 108038153 A | 5/2018 |
| CN | 109347982 A | 2/2019 |
| CN | 109379774 A | 2/2019 |
| CN | 109471705 A | 3/2019 |
| CN | 110120979 A | 8/2019 |
| WO | 2019094369 A1 | 5/2019 |

OTHER PUBLICATIONS

Office Action for CN201910420049.5, dated Mar. 29, 2021, 8 pages.
Extended European Search Report issued in EP19929870.4, dated Jan. 17, 2022, 6 pages.
Notice of Allowance for Chinese Application No. 201910420049.5 dated Jan. 5, 2023, 4 pages.

* cited by examiner

SCHEDULING METHOD AND APPARATUS, AND RELATED DEVICE

CROSS-REFERENCE TO RELATED APPLICATION(S)

This application is a continuation of International Patent Application No. PCT/CN2019/128545, filed on Dec. 26, 2019, which claims priority to Chinese Patent Application No. 201910420049.5, filed on May 20, 2019. The disclosures of the aforementioned applications are hereby incorporated by reference in their entireties.

TECHNICAL FIELD

The present application relates to the field of information technologies and, in particular, to a scheduling method and apparatus, and a related device.

BACKGROUND

With development of information technologies, a data center has entered a cloud data center era based on distributed virtualization technologies. By using the virtualization technologies, such as computing virtualization, network virtualization, and storage virtualization, the data center implements on-demand allocation and full utilization of local resources with high reliability, high stability, and high elasticity A distributed system is a unified computer system that includes a plurality of dispersed computers through an interconnection network. Physical resources and logical resources of each computer cooperate with each other and are highly independent, to implement resource management and data sharing in an entire system, implement dynamic task allocation and function allocation, and run a distributed program in parallel. The distributed system emphasizes comprehensive distribution of resources, tasks, functions, data, and control. The resources, the tasks, the functions, the data, and the control are distributed in physically dispersed computer nodes. The nodes communicate with each other through the interconnection network, to form a unified processing system.

Current communications technologies are all based on internal communication of a single cluster (namely, a single distributed system), and dynamic task allocation and resource scheduling can be performed only in one cluster.

SUMMARY

Embodiments of the present application disclose a scheduling method and apparatus, and a related device, to send a task across clusters, so as to implement resource sharing between different clusters, and increase resource utilization efficiency.

According to a first aspect, this application provides a scheduling method. The method includes a central cluster receiving a scheduling request sent by a first cluster, and determining a second cluster that meets the scheduling request. The central cluster indicates the first cluster to execute a task by using the second cluster.

In the embodiments of this application, the central cluster is used as a unified scheduling and control center, and performs unified scheduling after receiving the scheduling request sent by the first cluster. Specifically, the central cluster determines, from all clusters managed by the central cluster, the second cluster that meets the scheduling request. After determining the second cluster, the central cluster indicates that the first cluster may execute the task by using a resource in the second cluster. In this way, task cross-cluster scheduling is implemented. In other words, the task that is originally executed by the first cluster may be executed by using the second cluster, thereby implementing resource sharing between different clusters, and increasing resource utilization.

In a possible implementation, the scheduling request is generated by the first cluster when the first cluster does not have sufficient remaining resources to run the task, or the scheduling request is generated by the first cluster when the first cluster does not have an image to run the task.

In the embodiments of this application, before sending the scheduling request to the central cluster, the first cluster determines whether the first cluster has the image to run the task and whether the first cluster has the sufficient remaining resources to run the task. Only when the first cluster does not have the image and/or does not have the sufficient resources to run the task, the first cluster sends the scheduling request to the central cluster.

In a possible implementation, the central cluster determines the second cluster based on image information that is specified by the scheduling request and that matches the task. The image information includes a name of the image and a version number of the image, and the second cluster is a cluster that has authorized the first cluster to use the image specified by the image information.

In the embodiments of this application, when sending the scheduling request to the central cluster, the first cluster sends, to the central cluster, the image information that matches the task. The image information includes the name of the image and the version number of the image. After receiving the image information sent by the first cluster, the central cluster may find the second cluster that authorizes the first cluster to use the image specified by the image information, thereby further implementing resource sharing between the first cluster and the second cluster.

In a possible implementation, the central cluster determines, in at least one cluster that has the image specified by the image information, the second cluster that meets a resource that is required for running the task specified by the scheduling request.

In the embodiments of this application, the central cluster may find a plurality of clusters that authorize the first cluster to use a plurality of images specified by the image information. Remaining resources of some clusters in the plurality of found clusters may be insufficient to run the task. The central cluster needs to further determine, from the plurality of clusters, the second cluster whose remaining resources are sufficient to run the task specified by the scheduling request. In this way, it may be ensured that the determined second cluster can meet the scheduling request sent by the first cluster.

In a possible implementation, the central cluster sends an address and an identifier of the second cluster to the first cluster. The address and the identifier of the second cluster are used by the first cluster to access the second cluster.

In the embodiments of this application, after determining the second cluster that meets the scheduling request, the central cluster sends the address and the identifier of the second cluster to the first cluster. Therefore, it may be ensured that the first cluster can accurately establish communication with the second cluster, to execute the task by using the second cluster, thereby implementing resource sharing between clusters, and increasing resource utilization.

In a possible implementation, the central cluster authorizes the image that is in the second cluster and that runs the task for the first cluster.

In the embodiments of this application, the central cluster may authorize image information in clusters, for example, authorize the image that is in the second cluster and that runs the task for the first cluster. Therefore, task cross-cluster scheduling is implemented, thereby implementing resource sharing between clusters, and increasing resource utilization.

According to a second aspect, this application provides a scheduling method, including sending, by a first cluster, a scheduling request to a central cluster, where the scheduling request is used by the central cluster to determine a second cluster that meets the scheduling request, receiving, by the first cluster, an indication sent by the central cluster in response to the scheduling request, and executing, by the first cluster, a task by using the second cluster determined based on the indication.

In the embodiments of this application, the first cluster sends the scheduling request to the central cluster, and the central cluster serves as a unified scheduling and control center. After receiving the scheduling request sent by the first cluster, the central cluster performs unified scheduling, determines, from all clusters managed by the central cluster, the second cluster that meets the scheduling request, and indicates the first cluster to execute the task by using a resource in the determined second cluster. In this way, task cross-cluster scheduling is implemented, and the first cluster may execute the task by using the second cluster, thereby implementing resource sharing between different clusters, and increasing resource utilization.

In a possible implementation, the scheduling request is generated by the first cluster when the first cluster does not have sufficient remaining resources to run the task, or the scheduling request is generated by the first cluster when the first cluster does not have an image to run the task.

In a possible implementation, the first cluster receives an address and an identifier that are of the second cluster and that are sent by the central cluster. The address and the identifier of the second cluster are used by the first cluster to access the second cluster.

In a possible implementation, the first cluster uses a central authentication service (CAS) to authenticate the second cluster. After authentication succeeds, the first cluster sends the task to the second cluster, and receives an execution result obtained after the second cluster executes the task.

In the embodiments of this application, the first cluster completes authentication between clusters by using the CAS, to ensure that a quantity of clusters is not limited during cross-cluster access authentication, thereby improving cluster scalability, and ensuring a simple and reliable authentication process.

According to a third aspect, this application provides a scheduling apparatus used for a central cluster, including a receiving module, configured to receive a scheduling request sent by a first cluster, and a processing module, configured to determine a second cluster that meets the scheduling request, and indicate the first cluster to execute a task by using the second cluster.

In a possible implementation, the scheduling request is generated by the first cluster when the first cluster does not have sufficient remaining resources to run the task, or the scheduling request is generated by the first cluster when the first cluster does not have an image to run the task.

In a possible implementation, the processing module is configured to determine a second cluster based on image information that is specified by the scheduling request and that matches the task. The image information includes a name of an image and a version number of the image, and the second cluster is a cluster that has authorized the first cluster to use an image specified by the image information.

In a possible implementation, the processing module is configured to determine, in at least one cluster that has the image specified by the image information, a second cluster that meets a resource that is required for running the task specified by the scheduling request.

In a possible implementation, the scheduling apparatus further includes a sending module. The sending module is configured to send an address and an identifier of the second cluster to the first cluster. The address and the identifier of the second cluster are used by the first cluster to access the second cluster.

In a possible implementation, the processing module is further configured to authorize the first cluster for an image that is in the second cluster and that runs the task.

According to a fourth aspect, this application provides a scheduling apparatus used for a first cluster, including a sending module, configured to send a scheduling request to a central cluster, where the scheduling request is used by the central cluster to determine a second cluster that meets the scheduling request, a receiving module, configured to receive an indication sent by the central cluster in response to the scheduling request, and a processing module, configured to determine, by using the indication, the second cluster executes a task.

In a possible implementation, the scheduling request is generated by the scheduling apparatus when the scheduling apparatus does not have sufficient remaining resources to run the task, or the scheduling request is generated by the scheduling apparatus when the scheduling apparatus does not have an image to run the task.

In a possible implementation, the receiving module is configured to receive an address and an identifier that are of the second cluster and that are sent by the central cluster. The address and the identifier of the second cluster are used by the scheduling apparatus to access the second cluster.

In a possible implementation, the processing module is configured to use a CAS to authenticate the second cluster. The sending module is further configured to, after an authentication succeeds, send the task to the second cluster, and the receiving module is further configured to receive an execution result obtained after the second cluster executes the task.

According to a fifth aspect, this application provides a computing device. The computing device includes a processor and a memory. The processor executes a computer instruction stored in the memory, so that the computing device performs the method in any one of the first aspect and the implementations with reference to the first aspect.

According to a sixth aspect, this application provides a computing device. The computing device includes a processor and a memory. The processor executes a computer instruction stored in the memory, so that the computing device performs the method in any one of the second aspect and the implementations with reference to the second aspect.

According to a seventh aspect, this application provides a computer storage medium. The computer storage medium stores a computer program, and when the computer program is executed by a computing device, a procedure of the scheduling method in any one of the first aspect and the implementations with reference to the first aspect is implemented.

According to an eighth aspect, this application provides a computer storage medium. The computer storage medium stores a computer program, and when the computer program is executed by a computing device, a procedure of the scheduling method in any one of the second aspect and the implementations with reference to the second aspect is implemented.

According to a ninth aspect, this application provides a computer program product. The computer program product includes a computer instruction, and when the computer instruction is executed by a computing device, the computing device is enabled to perform the method in any one of the first aspect and the implementations with reference to the first aspect.

According to a tenth aspect, this application provides a computer program product. The computer program product includes a computer instruction, and when the computer instruction is executed by a computing device, the computing device is enabled to perform the method in any one of the second aspect and the implementations with reference to the second aspect.

BRIEF DESCRIPTION OF DRAWINGS

To describe the technical solutions in the embodiments of the present application more clearly, the following briefly describes the accompanying drawings for describing the embodiments.

DESCRIPTION OF EMBODIMENTS

The following describes the technical solutions in the embodiments of this application with reference to the accompanying drawings.

In the specification, claims, and accompanying drawings of this application, the terms "first," "second," "third," "fourth," and the like are intended to distinguish between different objects but do not indicate a particular order. In addition, the terms "including," "having," or any other variant thereof, are intended to cover non-exclusive inclusion. For example, a process, a method, a system, a product, or a device that includes a series of steps or units is not limited to the listed steps or units, but optionally further includes an unlisted step or unit, or optionally further includes another inherent step or unit of the process, the method, the product, or the device.

Mentioning an "embodiment" in the specification means that a particular characteristic, structure, or feature described with reference to the embodiments may be included in at least one embodiment of this application. The phrase shown in various locations in the specification may not necessarily refer to a same embodiment, and is not an independent or optional embodiment exclusive from another embodiment. It is explicitly and implicitly understood by a person skilled in the art that the embodiments described in the specification may be combined with another embodiment.

Terms such as "component," "module," and "system" used in this specification are used to indicate computer-related entities, hardware, firmware, combinations of hardware and software, software, or software being executed. For example, a component may be, but is not limited to, a process that runs on a processor, a processor, an object, an executable file, a thread of execution, a program, and/or a computer. As shown in the figures, both an application that runs on a computing device and the computing device may be components. One or more components may reside within a process and/or a thread of execution, and a component may be located on one computer and/or distributed between two or more computers. In addition, these components may be executed from various computer-readable media that store various data structures. For example, the components may communicate by using a local and/or remote process and based on, for example, a signal having one or more data packets (for example, data from two components interacting with another component in a local system, a distributed system, and/or across a network, for example, the internet interacting with another system by using the signal).

Some terms and related technologies in this application are first described with reference to the accompanying drawings, to help a person skilled in the art have a better understanding.

In a multi-program or multi-process environment, a task is a basic work unit that needs to be completed by a computer, and includes one or more instruction sequences. In an actual application, the task is a scheduled running entity that implements specific service logic. For example, a task is used to execute algorithm logic.

A cluster is a group of independent computers that are interconnected through a high-speed network. The computers form a group and are managed in a single system mode. When a user interacts with a cluster, the cluster serves as an independent server, and cluster configuration can improve availability and scalability. With a cluster technology, relatively high benefits in performance, high reliability, and flexibility may be obtained at low costs. Task scheduling is a core technology in a cluster system.

A yet another resource negotiator (YARN) is a resource management system, including a global resource manager (RM) and an application manager (AM) specific to each application. The RM is responsible for resource management and allocation of the entire system, and the AM is responsible for management of a single application. The YARN is a primary/secondary structure. The RM is responsible for performing unified management and scheduling on a resource of each node manager. When a user submits an application, an AM is required to provide to trace and manage the application. This AM is responsible for applying for a resource from the RM, and requires the node manager to start a task that may occupy a specific resource. Because different AMs are distributed to different nodes, the AMs do not affect each other. The RM includes a scheduler and an application manager (ASM). The scheduler allocates a resource in the system to each running application based on a limiting condition, for example, a capacity or a queue (for example, each queue is allocated with a specific resource, and executes a specific amount of work at most), and is not responsible for work related to a specific application. For example, the scheduler is not responsible for monitoring or tracking an execution status of an application, or responsible for restarting a failed task generated due to an application execution failure or a hardware fault, which are all completed by an AM related to the application. The scheduler allocates a resource only based on a resource requirement of each application. A resource allocation unit may be represented by a resource container. The container is a dynamic resource allocation unit, and encapsulates resources such as a memory, a central processing unit (CPU), a disk, and a network together, to limit an amount of resources used by each task. In addition, the scheduler is a pluggable component, and a user may design the scheduler as required, for example, a capacity scheduler or a fair scheduler. The ASM is responsible for all applications in the entire system, including submitting an application, negotiating a resource with the scheduler to start the AM, monitoring a running status of the AM, and restarting the AM when the AM fails to run.

Kerberos is a computer network authentication protocol, and used to authenticate an identity of personal communication by using a secure method on an insecure network. It is designed to provide a strong authentication service for a client/server application by using a key system. An authentication process does not depend on authentication of a host operating system, does not require trust based on a host address or physical security of all hosts on the network. In addition, it is assumed that a data packet transmitted on the network may be read, modified, and inserted data randomly. In this case, the kerberos, as a trusted third-party authentication service, performs the authentication service by using a conventional password technology (for example, a shared key). The authentication process is specifically as follows: a client sends a request to an authentication server (AS) for obtaining a certificate of a server, and a response of the AS includes certificates encrypted by using a client key. The certificate includes a server ticket and a session key. The server ticket includes client identity information encrypted by using a server key and a copy of the session key. The client encrypts the client identity information and timestamp by using the session key and sends the identity information, the timestamp, and the server ticket to the server.

A central authentication service is an independent open instruction protocol, and may provide a reliable single sign-on (SSO) method for a world wide web (WWW) application system. The SSO enables a user to access all mutually trusted application systems after logging in to a system only once in a plurality of application systems.

Currently, the YARN is used to implement dynamic task allocation and resource scheduling, thereby increasing resource utilization. However, the YARN can implement resource sharing only within a single cluster. When there are a plurality of clusters, task cross-cluster scheduling is not supported, and resource sharing between different clusters cannot be implemented. In addition, currently, the kerberos authentication is used to complete communication between services. However, the kerberos authentication limits a quantity of accessed clusters, and a maximum of 16 clusters can be mutually authenticated. There are some other authentication limitations, for example, a user whitelist for background authentication needs to be enabled, and an authentication requirement that a quantity of clusters is not limited cannot be met.

In conclusion, problems that need to be resolved in this application include how to support task cross-cluster scheduling to implement resource sharing between different clusters, and support cross-cluster access authentication to improve cluster scalability.

Figure 1:
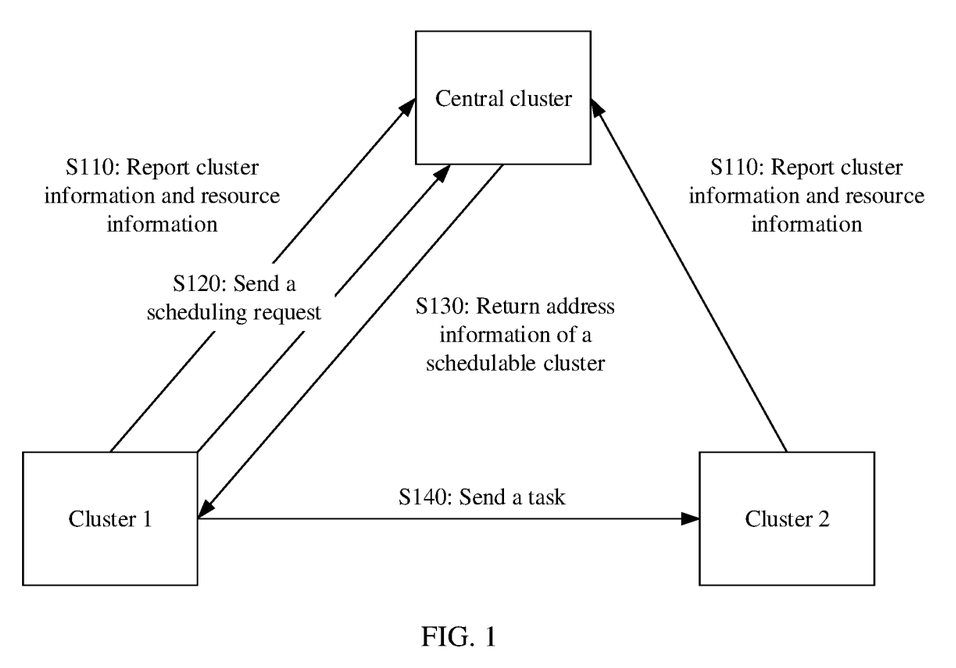
FIG. 1 is a non-limiting example schematic diagram of a scenario of task cross-cluster scheduling according to an embodiment of this application.

FIG. 1 is a schematic diagram of a scenario of task cross-cluster scheduling according to an embodiment of this application. As shown in FIG. 1, a central cluster receives cluster information and resource information that are reported by each of a cluster 1 and a cluster 2 (e.g., step S110), and manages the received cluster information and the received resource information. The cluster information may include image information of the cluster, identifier information of the cluster, level information of the cluster, and address information used by the cluster for an external connection. The image information of the cluster includes a list of images and version information of the cluster. The resource information may include resource usage information, remaining resource information, and resource change information. When a resource of the cluster 1 is insufficient, a task cannot be executed locally. Therefore, the cluster 1 sends a scheduling request (e.g., step S120) to the central cluster. The scheduling request includes a required memory resource, a required CPU resource, a name and a version number of an image that matches the task, and the like. After receiving the scheduling request sent by the cluster 1, the central cluster performs scheduling based on the previously received cluster information and the previously received resource information, and determines a schedulable cluster that meets the scheduling request, for example, determines that the cluster 2 is the schedulable cluster that meets the scheduling request, and returns the address information of the cluster 2 to the cluster 1 (e.g., step S130). After receiving the address information of the cluster 2, the cluster 1 sends the task to the cluster 2 (e.g., step S140), and executes the task by using a resource of the cluster 2, thereby implementing task cross-cluster scheduling. It should be understood that FIG. 1 merely provides an example of corresponding task cross-cluster scheduling when there are two clusters. For a case in which there are more clusters, task scheduling logic is consistent with the foregoing logic.

It should be noted that the central cluster, the cluster 1, and the cluster 2 may be deployed on an instance of one or more data centers. The instance includes a virtual machine, a container, or a physical machine. A specific implementation form of the instance is not limited in this application.

This application provides a scheduling method and apparatus, and a computing device, to support task cross-cluster scheduling, so as to implement resource sharing between different clusters, and increase resource utilization.

Figure 2:
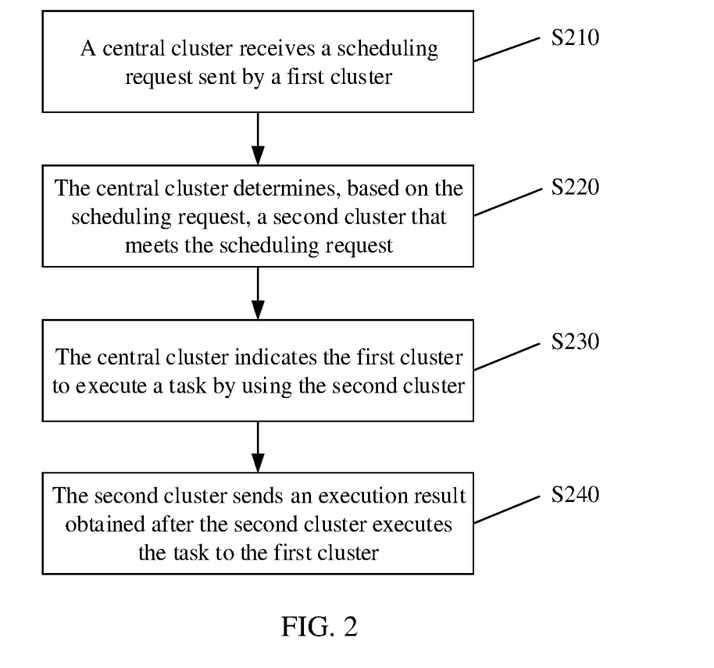
FIG. 2 is a non-limiting example schematic flowchart of a scheduling method according to an embodiment of this application.

Based on the foregoing descriptions, the following describes the scheduling method and apparatus, and the related device that are provided in the embodiments of this application. FIG. 2 is a schematic flowchart of a scheduling method according to an embodiment of this application. As shown in FIG. 2, the method includes, but is not limited to, the following steps.

S210: A central cluster receives a scheduling request sent by a first cluster.

Specifically, whether task cross-cluster scheduling is allowed needs to be preconfigured for the first cluster. When that task cross-cluster scheduling is allowed is configured for the first cluster, if resources of the first cluster are insufficient, a task cannot be executed locally, in other words, the resources of the first cluster cannot support normal running of the task. In this case, an artificial intelligence (AI) service of the first cluster automatically sends the scheduling request to the central cluster, to request task cross-cluster scheduling. Optionally, when the first cluster does not have an image to run the task, the task cannot be executed in the first cluster. In this case, the first cluster also needs to send the scheduling request to the central cluster, to request task cross-cluster scheduling.

Further, the first cluster sends required resources to the central cluster by using the scheduling request. The resources may include a memory resource, a graphics processing unit (GPU) resource, and a CPU resource that are required for running the task. In addition, the first cluster also sends, to the central cluster by using the scheduling request, a name and a version number of the image that matches the task.

If the task is used to execute an algorithm, the image includes a carrier used to execute the algorithm (e.g., one task matches one image). An image can have different version numbers. A same image with different version numbers belongs to different images, and has different functions, startup commands, and configuration files. For example, an image A has three different version numbers: an image A1.0, an image A2.0, and an image A3.0. In this case, the image A1.0, the image A2.0, and the image A3.0 are three different images. Therefore, if the first cluster needs to implement task cross-cluster scheduling, the first cluster needs to send, to the central cluster, a name and a corresponding version number of an image that matches the task, so that the central cluster can schedule the task that matches the name and the version number of the image.

In a possible implementation, the central cluster configures all lower-layer clusters including the first cluster. Specifically, the central cluster may configure a level relationship between clusters managed by the central cluster. For example, the central cluster may configure levels of all clusters to be the same, in other words, all the clusters are equal and have no parent-child relationship, and an entire cluster network is a cellular structure. Alternatively, the central cluster may configure levels of all clusters to be different, in other words, a parent-child relationship exists between different clusters, and an entire cluster network is a tree-like structure.

Figure 3A:
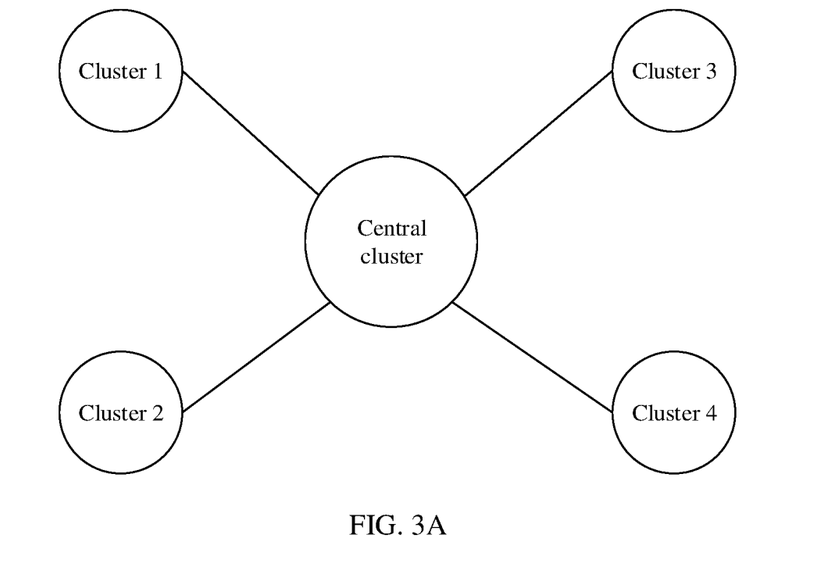
FIG. 3A is a non-limiting example schematic structural diagram of a cluster network according to an embodiment of this application.
Figure 3B:
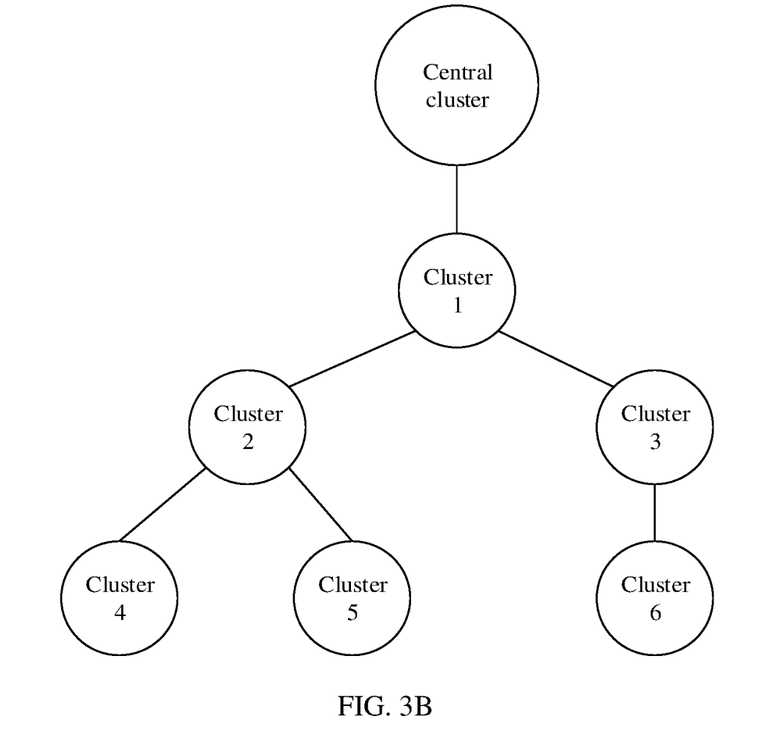
FIG. 3B is another non-limiting example schematic structural diagram of a cluster network according to an embodiment of this application.

For example, referring to FIG. 3A, the clusters managed by the central cluster include a cluster 1, a cluster 2, a cluster 3, and a cluster 4. The central cluster configures a same level for the four clusters, in other words, a cluster network including the four clusters is a cellular network, and is directly managed by the central cluster. Referring to FIG. 3B, a cluster 1, a cluster 2, a cluster 3, a cluster 4, a cluster 5, and a cluster 6 form a tree-like cluster network, and are managed by the central cluster in a unified manner. When configuring a level relationship between clusters, the central cluster configures the cluster 1 as a level—1 cluster, configures the cluster 2 and the cluster 3 as level—2 clusters, and configures the cluster 4, the cluster 5, and the cluster 6 as level—3 clusters. The cluster 2 and the cluster 3 are lower-layer clusters of the cluster 1, the cluster 4 and the cluster 5 are lower-layer clusters of the cluster 2, and the cluster 6 is a lower-layer cluster of the cluster 3. It should be noted that, in an actual application, the central cluster may specifically configure a cluster network as a cellular network, a tree-like network, or another network structure, and divide clusters in the cluster network into specific levels based on a requirement. This is not limited in this application.

In addition, the central cluster may further configure other information of each cluster. Optionally, the central cluster may configure address information of each cluster, identifier information of each cluster, and bandwidth information of each cluster. The address information includes a network address and a port number of the cluster, and the network address may be an internet protocol (IP) address used by the cluster for an external connection. The identifier information of the cluster may be a character string, for example, the character string is a segment of garbled characters configured by the background. The character string is a unique identity (ID) of the cluster in a network, and an ID of each cluster is different and unique.

In a possible implementation, the central cluster receives, by using a heartbeat mechanism, cluster information periodically reported by each cluster. Specifically, when each cluster in a cluster network installs a service, service configuration is performed. The configuration includes a network address and a reporting period of the central cluster. Each cluster may communicate with the central cluster by using the configured network address of the central cluster. In addition, each cluster periodically reports cluster information of the cluster to the central cluster based on the configured reporting period. The cluster information may include an address of the cluster, an identifier of the cluster, and remaining resources of the cluster. The central cluster maintains an online state of each cluster, and manages a life cycle of each cluster based on the cluster information reported by each cluster. If a cluster does not report the cluster information to the central cluster within a preset time period, the central cluster determines that the cluster is in an offline state, and removes the cluster from the cluster network.

In a possible implementation, each cluster has its own image repository, and an image in the image repository of each cluster may be different, or an image in the image repository of each cluster may be partially or entirely the same. A same image has a same image name in all clusters. For example, if the cluster 1 and the cluster 2 have a same image and a name of the image in the cluster 1 is image A, a name of the image in the cluster 2 is also the image A. Each cluster needs to report its own image information to the central cluster. Optionally, each cluster may report its own image information to the central cluster when periodically reporting cluster information of the cluster. The image information may include a name and a corresponding version number of an image. The central cluster may configure authorization for an image in each cluster and a version number corresponding to the image. For example, any image in any cluster may be authorized to another cluster for usage. For example, an image repository of the cluster 1 includes an image 1, an image 2, and an image 3, an image repository of the cluster 2 includes an image 4 and an image 5, and an image repository of the cluster 3 includes an image 6 and an image 7. The central cluster may authorize the cluster 2 to use the image 1 and the image 2 in the cluster 1, authorize the cluster 3 to use the image 3 in the cluster 1, authorize the cluster 1 to use the image 4 in the cluster 2, authorize the cluster 3 to use the image 5 of the cluster 2, authorize the cluster 1 to use the image 6 and the image 7 in the cluster 3, and authorize the cluster 2 to use the image 6 in the cluster 3.

Optionally, each cluster may set image information that needs to be reported, in other words, each cluster may selectively report image information of some images, and does not need to report image information of all images. For example, if the image repository of the cluster 1 has an image A1.0, an image A2.0, and an image B, the cluster 1 may only report the image A1.0 and the image B, and the central cluster may configure authorization for another cluster to use only the image A1.0 and the image B reported by the cluster 1.

In a possible implementation, the central cluster receives resource information periodically reported by each cluster. Specifically, the resource information periodically reported by each cluster may include a node type, a host name, a total quantity of CPU cores, a total quantity of disks, a total amount of memory, a host IP, a quantity of used CPU cores, disk usage, memory usage, or the like of each cluster server. The node type of the cluster server may include a data node and a computing node. It should be understood that the central cluster may also receive a quantity of remaining resources periodically reported by each cluster, for example, a remaining CPU amount or a remaining memory amount. After receiving the resource information or the quantity of the remaining resources periodically reported by each cluster, the central cluster manages resource usage information and resource remaining information of each cluster.

Optionally, when a resource of a cluster changes, the cluster needs to immediately report resource change information to the central cluster. For example, if a total quantity of CPU cores of a server of the cluster 1 increases from eight to ten, the cluster 1 needs to report a detail of changing of the total quantity of CPU cores to the central cluster in time.

S220: The central cluster determines, based on the scheduling request, a second cluster that meets the scheduling request.

Specifically, after receiving the scheduling request sent by the first cluster, the central cluster finds, based on a name and a version number corresponding to the name of an image that are in the scheduling request, the second cluster that configures authorization for the first cluster to use the matched image (e.g., has the name and the version number corresponding to the name of the image).

In a possible implementation, the central cluster determines, in at least one cluster that has the image specified by the image information, the second cluster that meets a resource that is required for running the task specified by the scheduling request.

Specifically, the central cluster may find a plurality of clusters that authorize the first cluster to use a plurality of images specified by the image information. Remaining resources of some clusters in the plurality of clusters may be insufficient to run the task. The central cluster needs to further determine, from the plurality of clusters, the second cluster whose remaining resources are sufficient to run the task specified by the scheduling request. For example, the central cluster may determine, from the plurality of clusters based on resource information (a memory resource, a CPU resource, a GPU resource, and the like) in the scheduling request, the second cluster whose remaining resources can meet a requirement for running the task.

Optionally, the central cluster determines a cluster with a largest quantity of remaining resources in the one or more clusters as the second cluster. Optionally, the central cluster may alternatively determine the second cluster based on another condition, for example, determine the second cluster based on network bandwidth of a cluster, determine the second cluster based on a distance from the first cluster, or randomly select one cluster from clusters that meet the scheduling request as the second cluster.

Therefore, a specific rule used to determine the second cluster from the one or more clusters is not limited in this application.

For example, a name and a corresponding version number of an image in the scheduling request sent by the cluster 1 to the central cluster is an image A1.0, and the central cluster finds a cluster that previously configures authorization for the cluster 1 to use the image A1.0. In the found cluster, if the cluster 2 has authorized the cluster 1 to use the image A1.0, the central cluster may further determine, based on resource information reported by the cluster 2, whether remaining resources of the cluster 2 can support successful running of the task, in other words, whether the remaining resources of the cluster 2 are greater than resources required by the scheduling request. If the remaining resources of the cluster 2 are greater than the resources required by the scheduling request, the central cluster may determine that the cluster 2 is a cluster that meets the scheduling request.

S230: The central cluster indicates the first cluster to execute the task by using the second cluster.

In a possible implementation, the central cluster sends first information that matches the second cluster to the first cluster.

Specifically, after determining the second cluster that meets the scheduling request, the central cluster sends the first information that matches the second cluster, namely, an IP address, a port number, and a unique ID of the second cluster, to the first cluster, so that the first cluster can communicate with the second cluster.

The first cluster sends the task to the second cluster. Optionally, after receiving the IP address, the port number, and the unique ID that are of the second cluster and that are sent by the central cluster, the first cluster uses a CAS to complete authentication of the first cluster at the second cluster. That is, the first cluster performs a login operation on the second cluster by using an authentication user between clusters. If login succeeds, it indicates that the authentication succeeds. After login succeeds, the first cluster sends the task and the unique ID of the second cluster to the second cluster. After receiving the unique ID sent by the first cluster, the second cluster checks whether the unique ID is the same as the ID of the second cluster. After checking that the unique ID is the same as the ID of the second cluster, the second cluster allows the first cluster to invoke an AI service of the second cluster to send the task, and run the task by using resources of the second cluster, and sends result information to the first cluster after the task is completed.

It should be noted that one cluster may create one user as an authentication user, and all clusters may create a same user to complete authentication between the clusters. For example, the cluster 1, the cluster 2, and the cluster 3 may respectively create a same user A in the cluster 1, the cluster 2, and the cluster 3 as a unified authentication user between the clusters. Currently, there are two authentication modes between the clusters: kerberos and the CAS. If the kerberos is used to complete the authentication between the clusters, mutual trust between authentication servers between the clusters needs to be configured. For example, mutual trust between the authentication server of the cluster 1, the authentication server of the cluster 2, and the authentication server of the cluster 3 is configured. However, the kerberos allows to configure a maximum of 16 mutual-trusted authentication servers between the clusters. In addition, if cross-cluster communication between services needs to be completed, for example, if a service A in the cluster 1 needs to communicate with a service B in the cluster 2, a user A in the cluster 1 needs to first generate a key.tab file, and then perform authentication on the authentication server of the cluster 2 by using the file. If authentication of the user A at the authentication server of the cluster 2 succeeds, the cluster 1 may communicate with the cluster 2, to be specific, the service A in the cluster 1 may communicate with the service B in the cluster 2. It can be learned that mutual trust between the authentication servers between the clusters needs to be configured, to complete, by using the kerberos for authentication, cross-cluster communication between the clusters. In addition, a quantity of accessed clusters is also limited. There are still some other authentication limitations with complex procedures, and a requirement that a quantity of clusters in authentication between the clusters is not limited cannot be met.

However, authentication between the clusters completed by using the CAS does not need to configure mutual trust between the authentication servers between the clusters. When each cluster creates a unified authentication user between the clusters, an account and a password of the unified authentication user between the clusters have to be the same, in other words, an account and a password of the user A are the same. Therefore, if cross-cluster communication between the services needs to be completed, for example, when the service A in the cluster 1 needs to communicate with the service B in the cluster 2, the user A in the cluster 1 directly performs a login operation on the cluster 2 or a service node corresponding to the cluster 2. If login succeeds, it indicates that authentication succeeds, and the cluster 1 may communicate with the cluster 2, to be specific, the service A in the cluster 1 may communicate with the service B in the cluster 2.

It may be understood that this application uses the CAS to complete the authentication between the clusters, to ensure that a quantity of clusters is not limited during cross-cluster access authentication, thereby improving cluster scalability, and ensuring a simple and reliable authentication process.

S240: The second cluster sends an execution result obtained after the second cluster executes the task to the first cluster.

Specifically, after receiving the task sent by the first cluster, the second cluster may implement, by using a YARN, dynamic task allocation and resource scheduling in the cluster, obtain the result information after finishing running the task, and return the result information to the first cluster.

Figure 4:
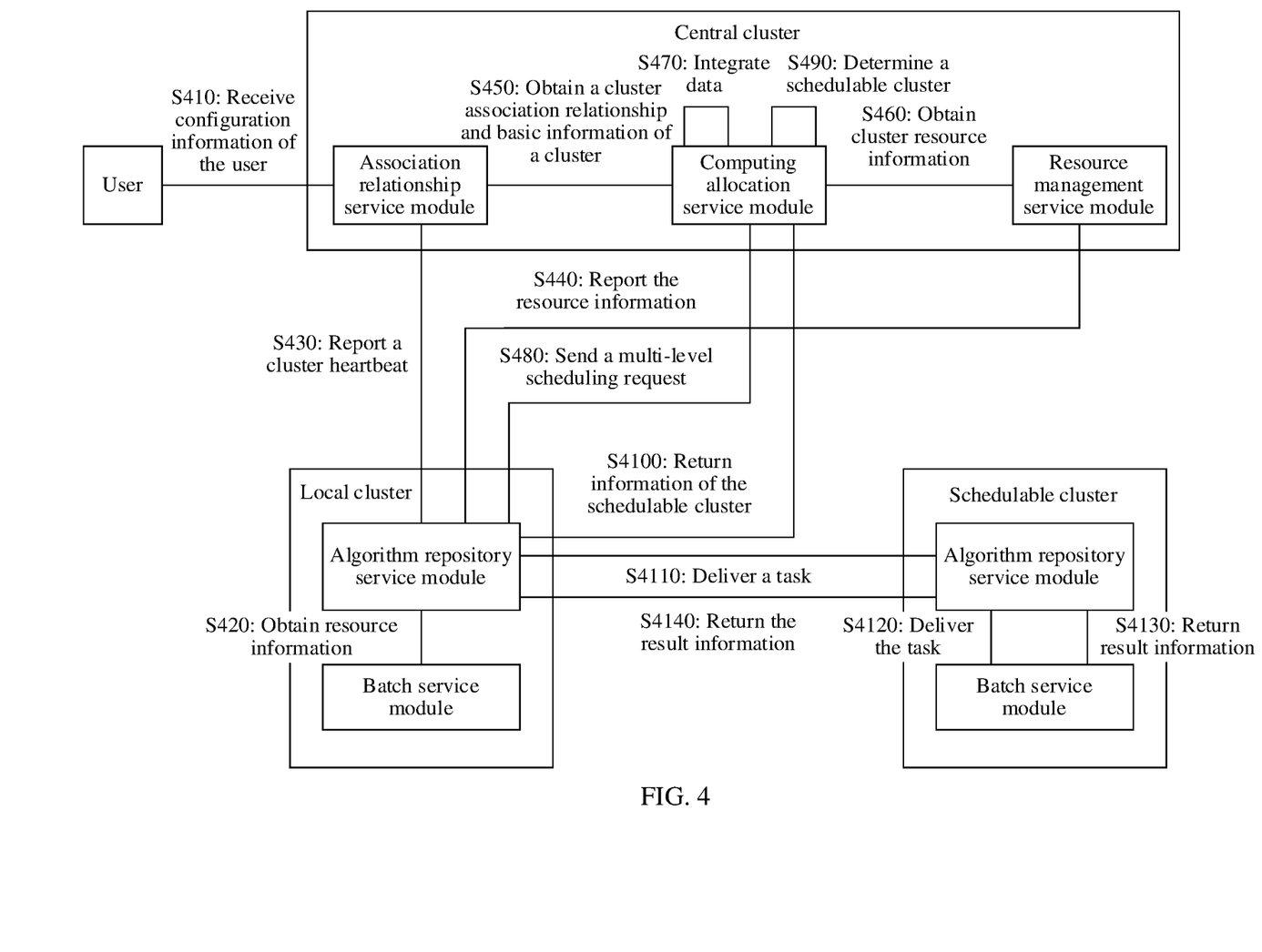
FIG. 4 is a non-limiting example schematic flowchart of another scheduling method according to an embodiment of this application.

To better understand the embodiments of this application, this application provides a schematic flowchart of still another scheduling method. FIG. 4 is a schematic flowchart of still another scheduling method according to an embodiment of this application. As shown in FIG. 4, a central cluster includes an association relationship service module, a computing allocation service module, and a resource management service module. A local cluster and a schedulable cluster respectively include an algorithm repository service module and a YARN service module. The algorithm repository service module stores and manages image information of a cluster. The YARN service module is responsible for task allocation and resource scheduling in the cluster. The method includes but is not limited to the following steps.

S410: The association relationship service module receives a configuration of a user.

Specifically, the user may configure a level relationship between clusters in a cluster network, and configure other information of the cluster, for example, an address of the cluster, an identifier of the cluster, and bandwidth of the cluster. The association relationship service module receives the configuration of the user, and stores and manages information configured by the user.

S420: The algorithm repository service module obtains resource information of the local cluster.

Specifically, the resource information of the local cluster may include a node type, a host name, a total quantity of CPU cores, a total quantity of disks, a total amount of memory, a host IP, a quantity of used CPU cores, a disk usage, a memory usage, or the like of each local cluster server. The node type of the cluster server may include a data node and a computing node.

S430: The algorithm repository service module reports a cluster heartbeat to the association relationship service module.

Specifically, when installing a service, the local cluster configures a network address and a reporting period of the central cluster. The algorithm repository service module reports the cluster heartbeat to the association relationship service module based on the reporting period. The association relationship service module maintains an online status of the local cluster, and manages a life cycle of the cluster based on the reported cluster heartbeat.

Optionally, the algorithm repository service module reports the image information of the local cluster to the association relationship service module when reporting the heartbeat. The image information includes a name of an image and a version number corresponding to the name of the image. The association relationship service module may configure authorization for each image in each cluster and a version number corresponding to each image. For example, any image in any cluster may be authorized to another cluster for usage.

Optionally, the algorithm repository service module may set to-be-reported image information, and does not need to report all image information of the local cluster.

S440: The algorithm repository service module reports the resource information to the resource management service module.

Specifically, the algorithm repository service module periodically reports the resource information to the resource management service module, and a period may be set based on an actual requirement. Optionally, when resources of the local cluster change, the algorithm repository service module needs to immediately report resource change information to the resource management service module. After receiving the resource information reported by the local cluster, the resource management service module manages resource usage information and resource remaining information of the local cluster.

S450: The computing allocation service module obtains a cluster association relationship and basic information of a cluster.

Specifically, the computing allocation service module obtains the cluster association relationship and the basic information of the cluster from the association relationship service module. The cluster association relationship may be a level relationship between clusters, and is configured by the user in the association relationship service module. The basic information of the cluster may be address information of the cluster, identifier information of the cluster, bandwidth information of the cluster, or the like, and is also configured by the user in the association relationship service module.

S460: The computing allocation service module obtains cluster resource information.

Specifically, the computing allocation service module obtains the cluster resource information from the resource management service module. The cluster resource information may be the resource information periodically reported from the local cluster and the schedulable cluster to the resource management service module, and may specifically include a node type, a host name, a total quantity of CPU cores, a total quantity of disks, a total amount of memory, a host IP, a quantity of used CPU cores, a disk usage, a memory usage, or the like of each cluster server.

S470: The computing allocation service module integrates data.

Specifically, the computing allocation service module summarizes and integrates all information obtained from the association relationship service module and the resource management service module into final data. When receiving the scheduling request, the computing allocation service module may allocate the schedulable cluster based on the final data.

S480: The algorithm repository service module sends the scheduling request to the computing allocation service module.

Specifically, in a process in which the algorithm repository service module in the local cluster runs a task, when local resources cannot meet a requirement for running the task, the algorithm repository service module sends a multi-level scheduling request to the computing allocation service module in the central cluster, so that the computing allocation service module may determine, based on the multi-level scheduling request, a schedulable cluster that meets the requirement for running the task. The multi-level scheduling request may specifically include a name of an image that matches the task, a version number corresponding to the name of the image, and resource information required for running the task.

S490: The computing allocation service module determines the schedulable cluster.

Specifically, after receiving the scheduling request sent by the algorithm repository service module, the computing allocation service module finds, based on the name of the image and the version number corresponding to the image that are in the scheduling request, one or more clusters that configure authorization for the local cluster to use a matched image (e.g., has the name of the image and the version number corresponding to the image), and determines the schedulable cluster that remaining resources of the schedulable cluster meet the requirement for running the task.

S4100: The computing allocation service module returns address information of the schedulable cluster to the algorithm repository service module.

Specifically, after determining the schedulable cluster, the computing allocation service module sends an IP address, a port number, and a unique ID of the schedulable cluster to the algorithm repository service module in the local cluster.

S4110: The algorithm repository service module in the local cluster sends the task to the algorithm repository service module in the schedulable cluster.

Specifically, the local cluster uses a CAS to complete authentication of the local cluster at the schedulable cluster.

Further, after receiving the IP address, the port number, and the unique ID of the schedulable cluster, the algorithm repository service module in the local cluster communicates with the algorithm repository service module in the schedulable cluster based on the IP address and the port number of the schedulable cluster, and sends the unique ID of the schedulable cluster to the algorithm repository service module in the schedulable cluster. The algorithm repository service module in the schedulable cluster verifies the unique ID, and accepts the task sent by the local cluster only after a verification succeeds.

S4120: The algorithm repository service module in the schedulable cluster sends the task to the YARN service module.

Specifically, after receiving the task sent by the algorithm repository service module, the YARN service module performs resource scheduling in the cluster to run the task, and obtains result information after running of the task is completed.

S4130: The YARN service module in the schedulable cluster returns the result information to the algorithm repository service module in the schedulable cluster.

S4140: The algorithm repository service module in the schedulable cluster returns the result information to the algorithm repository service module in the local cluster.

It should be noted that for a specific implementation process of steps S410 to S4140, refer to related descriptions in FIG. 1 to FIG. 3.

It should be understood that structures of the central cluster, the local cluster, and the schedulable cluster and a scheduling process of task cross-cluster scheduling are merely examples, and should not constitute a specific limitation. Modules in the central cluster, the local cluster, and the schedulable cluster may be added, reduced, or combined as required. In addition, operations and/or functions of the modules in the central cluster, the local cluster, and the schedulable cluster are respectively intended to implement corresponding procedures of the methods in FIG. 1 to FIG. 4.

The methods in the embodiments of this application are described in detail above. For ease of better implementing the solutions in the embodiments of this application, correspondingly related devices used to cooperate in implementing the solutions are further provided below.

Figure 5:
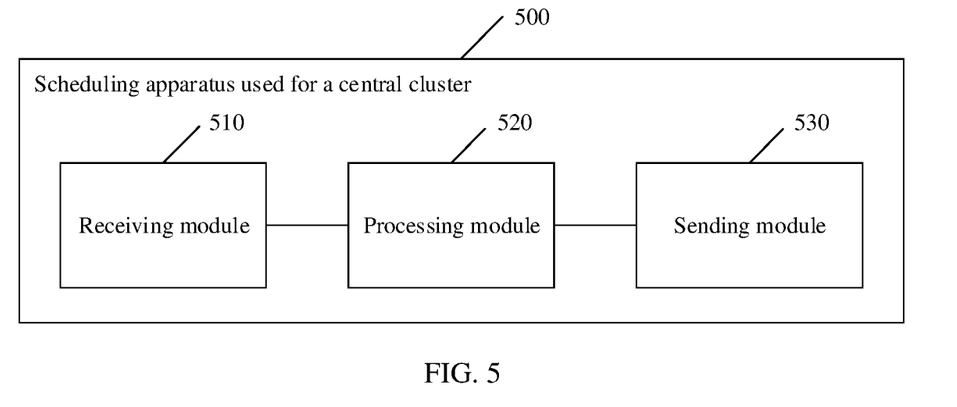
FIG. 5 is a non-limiting example schematic structural diagram of a scheduling apparatus used for a central cluster according to an embodiment of this application.

FIG. 5 is a schematic structural diagram of a scheduling apparatus used for a central cluster according to an embodiment of this application. As shown in FIG. 5, a scheduling apparatus 500 used by the central cluster includes a receiving module 510 and a processing module 520.

The receiving module 510 is configured to receive a scheduling request sent by a first cluster.

The processing module 520 is configured to determine a second cluster that meets the scheduling request, and indicate the first cluster executes a task by using the second cluster.

In a possible implementation, the scheduling request is generated by the first cluster when the first cluster does not have sufficient remaining resources to run the task, or the scheduling request is generated by the first cluster when the first cluster does not have an image to run the task.

In a possible implementation, the processing module 520 is configured to determine a second cluster based on image information that is specified by the scheduling request and that matches the task. The image information includes a name of an image and a version number of the image, and the second cluster is a cluster that has authorized the first cluster to use an image specified by the image information.

In a possible implementation, the processing module 520 is configured to determine, in at least one cluster that has the image specified by the image information, a second cluster that meets a resource that is required for running the task specified by the scheduling request.

In a possible implementation, the scheduling apparatus 500 further includes a sending module 530. The sending module 530 is configured to send an address and an identifier of the second cluster to the first cluster. The address and the identifier of the second cluster are used by the first cluster to access the second cluster.

In a possible implementation, the processing module 520 is further configured to authorize the first cluster for an image that is in the second cluster and that runs the task.

It should be understood that a structure of the scheduling apparatus used by the central cluster and a scheduling process of task cross-cluster scheduling are merely examples, and should not constitute a specific limitation. Modules in the scheduling apparatus used by the central cluster may be added, reduced, or combined as required. In addition, operations and/or functions of the scheduling apparatus used by the central cluster are respectively intended to implement corresponding procedures of the methods in FIG. 2 and FIG. 4.

Figure 6:
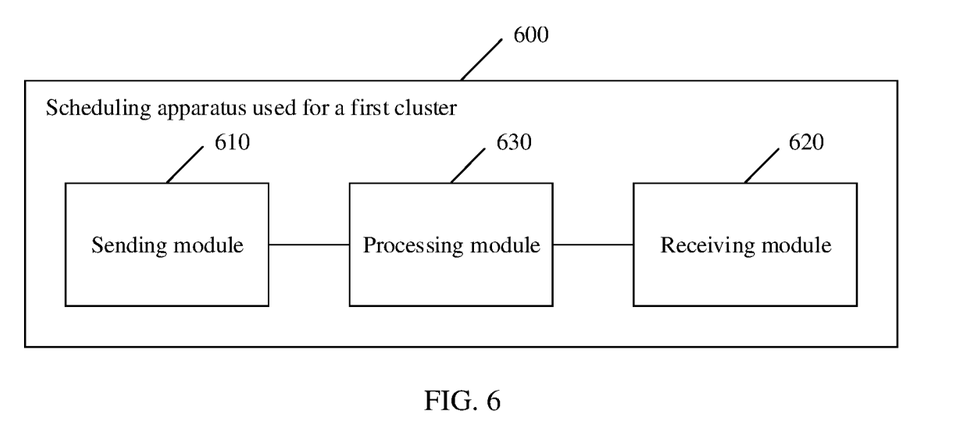
FIG. 6 is a non-limiting example schematic structural diagram of a scheduling apparatus used for a first cluster according to an embodiment of this application.

FIG. 6 is a schematic structural diagram of a scheduling apparatus used for a first cluster according to an embodiment of this application. As shown in FIG. 6, a scheduling apparatus 600 used by the first cluster includes a sending module 610, a receiving module 620, and a processing module 630.

The sending module 610 is configured to send a scheduling request to a central cluster. The scheduling request is used by the central cluster to determine a second cluster that meets the scheduling request.

The receiving module 620 is configured to receive an indication sent by the central cluster in response to the scheduling request.

The processing module 630 is configured to execute a task by using the second cluster determined based on the indication.

In a possible implementation, the scheduling request is generated by the scheduling apparatus when the scheduling apparatus does not have sufficient remaining resources to run the task, or the scheduling request is generated by the scheduling apparatus when the scheduling apparatus does not have an image to run the task.

In a possible implementation, the receiving module 620 is configured to receive an address and an identifier that are of the second cluster and that are sent by the central cluster. The address and the identifier of the second cluster are used by the scheduling apparatus 600 to access the second cluster.

In a possible implementation, the processing module 630 is configured to use a CAS to authenticate the second cluster; the sending module 610 is further configured to: after an authentication succeeds, send the task to the second cluster; and the receiving module 620 is further configured to receive an execution result obtained after the second cluster executes the task.

It should be understood that a structure of the scheduling apparatus used by the first cluster and a scheduling process of task cross-cluster scheduling are merely examples, and should not constitute a specific limitation. Modules in the scheduling apparatus used by the first cluster may be added, reduced, or combined as required. In addition, operations and/or functions of the modules in the scheduling apparatus used by the first cluster are respectively intended to implement corresponding procedures of the methods in FIG. 2 and FIG. 4.

Figure 7:
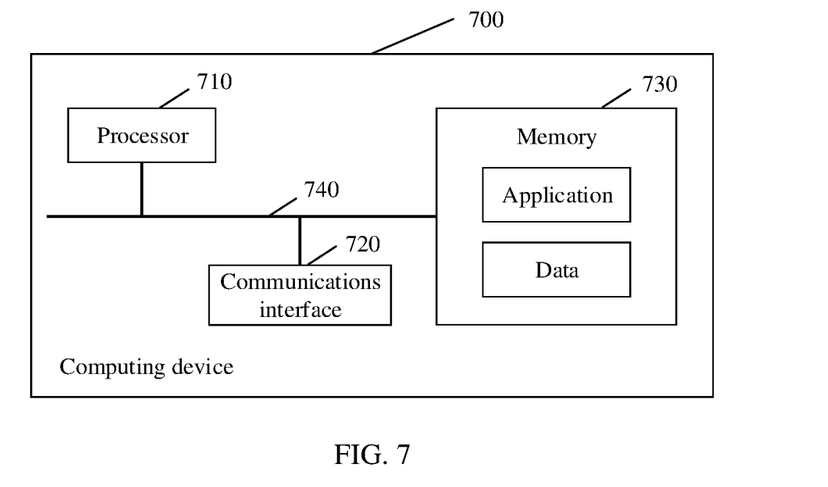
FIG. 7 is a non-limiting example schematic structural diagram of a computing device according to an embodiment of this application.

FIG. 7 is a schematic structural diagram of a computing device according to an embodiment of this application. As shown in FIG. 7, a computing device 700 includes a processor 710, a communications interface 720, and a memory 730. The processor 710, the communications interface 720, and the memory 730 are connected to each other by using an internal bus 740. It should be understood that the computing device may be a computer, or a server.

The processor 710 may include one or more general-purpose processors, for example, a central processing unit (CPU), or a combination of a CPU and a hardware chip. The hardware chip may be an application-specific integrated circuit (application—ASIC), a programmable logic device (PLD), or a combination thereof. The PLD may be a complex programmable logic device (CPLD), a field-programmable gate array (FPGA), a generic array logic (GAL), or any combination thereof.

The bus 740 may be a peripheral component interconnect (PCI) bus, an extended industry standard architecture (EISA) bus, or the like. The bus 740 may be classified into an address bus, a data bus, a control bus, and the like. For ease of representation, only one thick line is used to represent the bus in FIG. 7, but this does not mean that there is only one bus or only one type of bus.

The memory 730 may include a volatile memory, for example, a random access memory (RAM), or the memory 730 may include a non-volatile memory, for example, a read-only memory (ROM), a flash memory, a hard disk drive (HDD), or a solid-state drive (SSD), or the memory 730 may include a combination of the foregoing types. The memory 730 may be configured to store a program and data, so that the processor 710 invokes the program code and the data that are stored in the memory 730, to implement a function of the foregoing processing module. The program code may be used to implement a function module in the scheduling apparatus used by the central cluster shown in FIG. 5 or a function module in the scheduling apparatus used by the first cluster shown in FIG. 6, or used to implement method steps that are performed by the central cluster or the first cluster in the method embodiments shown in FIG. 2 and FIG. 4.

This application further provides a computer storage medium. The computer storage medium stores a computer program. When the computer program is executed by a processor, some or all of the steps described in the foregoing method embodiments may be implemented, and a function of any function module described in FIG. 5 and FIG. 6 may be implemented.

The embodiments of the present application further provide a computer program. The computer program includes a computer instruction. When the computer instruction is executed by a computer, some or all of the steps in any one of the scheduling methods may be performed, and a function of any function module described in FIG. 5 and FIG. 6 may be executed.

In the foregoing embodiments, the description of each embodiment has respective focuses. For a part that is not described in detail in an embodiment, refer to related descriptions in other embodiments.

It should be noted that, for brief description, the foregoing method embodiments are represented as a series of actions. However, a person skilled in the art should appreciate that this application is not limited to the described orders of the actions, because according to this application, some steps may be performed in other orders or simultaneously. It should be further appreciated by a person skilled in the art that the embodiments described in this specification all belong to preferred embodiments, and the involved actions and modules are not necessarily required by this application.

In the several embodiments provided in this application, it should be understood that the disclosed apparatus may be implemented in another manner. For example, the described apparatus embodiment is merely an example. For example, the unit division is merely logical function division and may be other division in an actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic or other forms.

The foregoing units described as separate parts may or may not be physically separate, and parts displayed as units may or may not be physical units, may be located in one position, or may be distributed on a plurality of network units. Some or all of the units may be selected based on actual requirements to achieve the objectives of the solutions of the embodiments.

In addition, functional units in the embodiments of this application may be integrated into one processing unit, or each of the units may exist alone physically, or two or more units are integrated into one unit. The integrated unit may be implemented in a form of hardware, or may be implemented in a form of a software functional unit.

What is claimed is:

1. A scheduling method applied to a central cluster having an algorithm repository service module, an association relationship service module, a computing allocation service module, and a resource management service module, and configured for cross-cluster scheduling of tasks across multiple managed clusters, the method comprising:
   receiving, by the central cluster and by using a heartbeat mechanism, image information periodically reported by each managed cluster, wherein the image information comprises a name of an image and a version number of the image available at each respective managed cluster,
      wherein the algorithm repository service module reports the heartbeat mechanism to the association relationship service module based on a reporting period,
      the algorithm repository service module reports resource information to the resource management service module,
      the computing allocation service module obtains resource information from the resource management service module, and
      the computing allocation service module summarizes and integrates all information obtained from the resource management service module into final data;
   receiving, by the central cluster, a scheduling request sent by a first managed cluster;
   determining, by the central cluster, and utilizing the final data, a second managed cluster meeting a requirement of the scheduling request; and
   indicating, by the central cluster, the first managed cluster to execute a task by using the second managed cluster, wherein
   determining the second managed cluster meeting the scheduling request comprises:
      determining, by the central cluster, the second managed cluster based on the second managed cluster having an image matching image information specified by the scheduling request, wherein the image information specified by the scheduling request comprises a name of an image and a version number of the image, and the second managed cluster has authorized the first managed cluster to use the image specified by the image information;
   sending, by the first managed cluster, the task to the second managed cluster based on the indicating;
   executing the task on the second managed cluster using the matching image; and
   sending execution results associated with the task to the first managed cluster.

2. The method according to claim 1, wherein the scheduling request is generated by the first managed cluster when the first managed cluster does not have sufficient remaining resources to run the task, or when the first managed cluster does not have the image to run the task.

3. The method according to claim 1, wherein determining the second managed cluster comprises:
   determining, by the central cluster in at least one cluster having the image specified by the image information, the second managed cluster meeting a resource required for running the task specified by the scheduling request.

4. The method according to claim 1, wherein indicating the first managed cluster to execute the task by using the second managed cluster comprises:
   sending, by the central cluster, an address and an identifier of the second managed cluster to the first managed cluster, wherein the address and the identifier of the second managed cluster are used by the first managed cluster to access the second managed cluster.

5. The method according to claim 1, further comprising:
   authorizing, by the central cluster, an image in the second managed cluster and running the task for the first managed cluster.

6. The method according to claim 1, further comprising:
   performing service configuration in association with at least the first managed cluster or the second managed cluster installing a service, wherein the service configuration includes a network address and the reporting period.

7. The method according to claim 1, wherein the resource information includes any of: a node type, a host name, a total quantity of CPU cores, a total quantity of disks, a total amount of memory, a host IP, a quantity of used CPU cores, a disk usage, and a memory usage.

8. The method according to claim 1, wherein the association relationship service module maintains an online status of at least the first managed cluster and manages a life cycle of the first managed cluster based on the reported heartbeat mechanism.

9. The method according to claim 1, wherein the algorithm repository service module sends a multi-level scheduling request to the computing allocation service module so that the computing allocation service module may determine a schedulable cluster meeting the requirement for executing the task.

10. The method according to claim 9, wherein the multi-level scheduling request includes at least the name of the image matching the task, the version number corresponding to the name of the image, and the resource information required for executing the task.

11. A scheduling method, comprising:
   sending, by a first managed cluster, a scheduling request to a central cluster having an algorithm repository service module, an association relationship service module, a computing allocation service module, and a resource management service module, and configured for cross-cluster scheduling of tasks across multiple managed clusters, wherein the scheduling request is used by the central cluster to determine a second managed cluster meeting a requirement of the scheduling request, the second managed cluster is determined based on image information specified by the scheduling request, and the image information comprises a name of an image and a version number of the image available at each respective managed cluster, wherein the algorithm repository service module reports the heartbeat mechanism to the association relationship service module based on a reporting period, the algorithm repository service module reports resource information to the resource management service module, the computing allocation service module obtains resource information from the resource management service module, and the computing allocation service module summarizes and integrates all information obtained from the resource management service module into final data;

receiving, by the first managed cluster, an indication sent by the central cluster in response to the scheduling request; and sending, by the first managed cluster, a task by using the second managed cluster determined based on the indication, wherein the second managed cluster executes the task using a matching image; and receiving execution results associated with the task from the second managed cluster, wherein the second managed cluster has authorized the first managed cluster to use the image specified by the image information, and by using a heartbeat mechanism, the central cluster receives image information periodically reported by each managed cluster, wherein method further comprises:

using, by the first managed cluster, a central authentication service (CAS) to authenticate the second managed cluster; and after authentication succeeds, sending, by the first managed cluster, the task to the second managed cluster, and receiving an execution result obtained after the second managed cluster executes the task.

12. The method according to claim 11, wherein the scheduling request is generated by the first managed cluster when the first managed cluster does not have sufficient remaining resources to run the task, or when the first managed cluster does not have the image to run the task.

13. The method according to claim 11, wherein receiving the indication sent by the central cluster in response to the scheduling request comprises:

receiving, by the first managed cluster, an address and an identifier of the second managed cluster and sent by the central cluster, wherein the address and the identifier of the second managed cluster are used by the first managed cluster to access the second managed cluster.

14. A computing device applied to a central cluster having an algorithm repository service module, an association relationship service module, a computing allocation service module, and a resource management service module, and configured for cross-cluster scheduling of tasks across multiple managed clusters, the computing device comprising:

a processor; and a memory configured to store computer readable instructions that, when executed by the processor, cause the computing device to:

receive, by using a heartbeat mechanism, image information periodically reported by each managed cluster, wherein the image information comprises a name of an image and a version number of the image available at each respective managed cluster, wherein the algorithm repository service module reports the heartbeat mechanism to the association relationship service module based on a reporting period, the algorithm repository service module reports resource information to the resource management service module, the computing allocation service module obtains resource information from the resource management service module, and the computing allocation service module summarizes and integrates all information obtained from the resource management service module into final data;

receive a scheduling request sent by a first managed cluster;

determine, by utilizing the final data, a second managed cluster meeting a requirement of the scheduling request; and indicate the first managed cluster to execute a task by using the second managed cluster, wherein determining the second managed cluster meeting the scheduling request comprises:

determining the second managed cluster based on the second managed cluster having an image matching image information specified by the scheduling request, wherein the image information specified by the scheduling request comprises a name of an image and a version number of the image, and the second managed cluster has authorized the first managed cluster to use the image specified by the image information;

send the task to the second managed cluster based on the indicating;

execute the task on the second managed cluster using the matching image; and send execution results associated with the task to the first managed cluster.

15. The computing device according to claim 14, wherein the scheduling request is generated by the first managed cluster when the first managed cluster does not have sufficient remaining resources to run the task, or when the first managed cluster does not have the image to run the task.

16. The computing device according to claim 14, wherein the computing device is configured to:

determine, in at least one cluster having the image specified by the image information, the second managed cluster meeting a requirement of a resource required for running the task specified by the scheduling request.

17. The computing device according to claim 14, wherein the computing device is configured to:

send an address and an identifier of the second managed cluster to the first managed cluster, wherein the address and the identifier of the second managed cluster are used by the first managed cluster to access the second managed cluster.

18. The computing device according to claim 14, wherein the computing device is configured to:

authorize an image in the second managed cluster and running the task for the first managed cluster.

19. A computing device applied to a first managed cluster, the computing device comprising:

a processor; and a memory configured to store computer readable instructions that, when executed by the processor, cause the computing device to:

send a scheduling request to a central cluster having an algorithm repository service module, an association relationship service module, a computing allocation service module, and a resource management service module, and configured for cross-cluster scheduling of tasks across multiple managed clusters, wherein the scheduling request is used by the central cluster to determine a second managed cluster meeting a requirement of the scheduling request, the second managed cluster is determined based on image information specified by the scheduling request, and the image information comprises a name of an image and a version number of the image available at each respective managed cluster, wherein the algorithm repository service module reports the heartbeat mechanism to the association relationship service module based on a reporting period, the algorithm repository service module reports resource information to the resource management service module, the computing allocation service module obtains resource information from the resource management service module, and the computing allocation service module summarizes and integrates all information obtained from the resource management service module into final data;

receive an indication sent by the central cluster in response to the scheduling request; and send a task by using the second managed cluster determined based on the indication, wherein the second managed cluster executes the task using a matching image; and receive execution results associated with the task from the second managed cluster, wherein the second managed cluster has authorized the first managed cluster to use the image specified by the image information, and by using a heartbeat mechanism, the central cluster receives image information periodically reported by each managed cluster, wherein the computing device is further caused to:

use a central authentication service (CAS) to authenticate the second managed cluster;

after authentication succeeds, send the task to the second managed cluster; and receive an execution result obtained after the second managed cluster executes the task.

20. The computing device according to claim 19, wherein the scheduling request is generated when the first managed cluster does not have sufficient remaining resources to run the task, or when the first managed cluster does not have the image to run the task.

21. The computing device according to claim 19, wherein the computing device is configured to:

receive an address and an identifier of the second managed cluster, wherein the address and the identifier of the second managed cluster are used by the first managed cluster to access the second managed cluster.

* * * * *